(12) United States Patent
Humphries et al.

(10) Patent No.: US 7,534,071 B2
(45) Date of Patent: *May 19, 2009

(54) CHANNEL INSTALLATION DEVICE

(75) Inventors: Derek Humphries, Chardon, OH (US); James McConnell, Orwell, OH (US)

(73) Assignee: ACO Polymer Products, Inc., Chardon, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/763,511

(22) Filed: Jun. 15, 2007

(65) Prior Publication Data

US 2007/0237619 A1 Oct. 11, 2007

Related U.S. Application Data

(63) Continuation of application No. 10/951,180, filed on Sep. 27, 2004, now Pat. No. 7,252,457.

(60) Provisional application No. 60/587,567, filed on Jul. 13, 2004.

(51) Int. Cl.
*E02B 5/00* (2006.01)

(52) U.S. Cl. .................. 405/118; 405/36; 405/119; 248/48.1

(58) Field of Classification Search ............. 248/48.1, 248/48.2, 65, 49, 59, 58; 405/119, 36, 118
See application file for complete search history.

(56) References Cited

U.S. PATENT DOCUMENTS

| | | |
|---|---|---|
| 1,584,756 A | 5/1926 | Dougherty |
| 2,147,799 A | 2/1939 | Reynolds |
| 2,305,955 A | 12/1942 | Dudley |
| 2,686,960 A | 8/1954 | Le Roy |
| 2,917,804 A | 12/1959 | Barron |
| 3,228,679 A | 1/1966 | Dees |
| 3,859,000 A | 1/1975 | Webster |
| 4,013,021 A | 3/1977 | Steinlein et al. |
| 4,337,005 A | 6/1982 | LeBaron |
| 4,367,142 A | 1/1983 | Blecher |
| 4,522,531 A | 6/1985 | Thomsen et al. |
| 4,553,874 A | 11/1985 | Thomann et al. |
| RE32,248 E | 9/1986 | Blecher |
| 4,630,966 A | 12/1986 | Karbstein |
| 4,699,544 A | 10/1987 | Karbstein |
| 4,844,655 A | 7/1989 | Aleshire |
| 4,878,782 A | 11/1989 | Beattie et al. |
| 4,981,395 A | 1/1991 | Datin et al. |
| 4,993,877 A | 2/1991 | Beamer |
| 5,066,165 A | 11/1991 | Wofford et al. |
| 5,226,748 A | 7/1993 | Barenwald et al. |
| 5,372,457 A | 12/1994 | Rante |
| 5,399,047 A | 3/1995 | Stegall |
| 5,443,327 A | 8/1995 | Akkala et al. |
| 5,462,382 A | 10/1995 | Sauerwein et al. |
| 5,518,339 A | 5/1996 | Shimizu |
| 5,522,675 A | 6/1996 | Gunter |

(Continued)

*Primary Examiner*—Amy J. Sterling
(74) *Attorney, Agent, or Firm*—Pearne & Gordon LLP

(57) ABSTRACT

A cradle assembly for installing trench drain or conduit channels which enables the channels to be suspended from support rods while simultaneously permitting the adjustment of the channel height with in the trench. Because the assembly enables the channel to be supported by the support rods while permitting adjustment of the channel height, final adjustments can be performed by a single worker.

18 Claims, 3 Drawing Sheets

U.S. PATENT DOCUMENTS

| | | |
|---|---|---|
| 5,529,436 A | 6/1996 | Meyers |
| 5,538,361 A | 7/1996 | Beamer |
| 5,735,637 A | 4/1998 | Gunter |
| 5,971,662 A | 10/1999 | Becker et al. |
| 5,989,417 A | 11/1999 | Fleischhacker |
| 6,000,881 A | 12/1999 | Becker et al. |
| 6,143,168 A | 11/2000 | Shackelford |
| 6,220,784 B1 | 4/2001 | Bricker |
| 6,418,861 B1 | 7/2002 | Flam |
| 6,860,678 B2 | 3/2005 | Gunter |
| 7,125,506 B2 | 10/2006 | Humphries |

CHANNEL INSTALLATION DEVICE

CROSS-REFERENCE TO RELATED APPLICATIONS

The present application is a continuation of U.S. patent application Ser. No. 10/951,180 filed Sep. 27, 2004, which claims the benefit of U.S. Provisional Patent Application No. 60/587,567 filed Jul. 13, 2004, both of which are incorporated herein by reference in their entireties.

BACKGROUND OF THE INVENTION

The present invention relates to trench drains or drainage channels used for the drainage of surface water or as ducting for cables and the like. Trench drains and similar drainage structures are used in a variety of environments, such as walkways, bike and foot paths, outdoor malls, parking lots, factories, airport tarmacs and other traffic environments which require the drainage of surface water or other fluids. Trench drains and drainage structures generally are known in the art as described in, for example, U.S. Pat. Nos. 4,630,966; 4,699,544; 5,462,382 and 4,553,874, incorporated herein by reference, and typically include a series of generally U-shaped channel segments or units aligned end-to-end along an excavated trench, and fixed in place by concrete or the like. For trench drains to function properly it is important that they are installed with the proper alignment and pitch so that the connected segments form an effective flow path for the surface water, as well as to ensure that the upper edges lie substantially flush with the surface and even with each other so as to properly seat a surface grate. Ducting is created in the same manner as a trench drain except that the grating which allows the passage of surface water is replaced with a solid cover. In this way, the trench can be used to carry communications cables and the like rather than water.

There are numerous methods and devices known for installing drainage channels as described in, for example, U.S. Pat. Nos. 4,878,782; 5,372,457; 5,226,748 and 5,522,675, incorporated herein by reference. Typically, the trench drain segments or units must be joined end-to-end in properly aligned fashion and then suspended and fixed in this position within the pre-excavated trench to enable the concrete to be poured into the trench and around the drainage channel without displacing the channel segments. In one such method, pairs of steel rods such as rebar are driven vertically into the bottom of the trench at appropriate distances to form two rows of support members along the length of the trench between which the drainage channel may be suspended. Next, a device capable of supporting or hanging the drainage channel segments from the support rods is either placed on each pair of support rods and secured in place to receive and support the channel segments within the trench, or affixed to a channel segment and then disposed on the support rods along with the channel segment. Once suspended, the channel segments can be adjusted vertically within the trench by disengaging the supporting device on the support rods and moving the device up or down on the rod to manually level and align the respective segments. Once the proper alignment is obtained, the supporting device is resecured to the support rod to suspend and fix the drainage channel in place so that it will not shift or float during final installation in concrete.

Because polymer concrete drainage channel sections can be heavy and difficult to manipulate, manual adjustment of the segments on the support rods is generally labor intensive, often requiring two or more workers. Accordingly, it would be advantageous if an installation device and method could improve the efficiency and accuracy with which drainage channels may be installed.

SUMMARY OF THE INVENTION

The invention provides a cradle assembly for supporting at least a portion of a channel segment in an adjustable manner on a support member. The assembly includes a cradle adapted to receive a portion of at least one channel segment and at least one adjusting mechanism disposed on the cradle. The adjusting mechanism is adapted to secure the cradle assembly to the support member and to permit adjustment of the position of the cradle relative to said support member while the assembly is secured thereto. In this way, when the cradle assembly is secured to said support member, said cradle position can be adjusted relative to the support member.

In one aspect of the invention, the adjusting mechanism comprises a first adjusting component secured to the cradle and a second adjusting component adapted to be secured to the support member, and includes means for adjusting the distance between the two components. In one embodiment, each of the first and second adjusting components includes a passage adapted to receive the support member and a screw adapted to bear on the support member when disposed in the passage so as to fix the respective adjusting components to the support member. Further, one of the adjusting components includes a screw adapted to cooperate with the other adjusting component so as to adjust the relative distance between the two components when the screw is actuated. In a preferred aspect of the invention the passages are substantially co-registered and one of the first or second adjusting components includes a pair of guide tabs extending toward the other of the adjusting components and spaced to receive at least a portion of the other adjusting component therebetween. This serves to substantially maintain the relative co-registration of said passages in said adjusting components.

In many embodiments, the cradle comprises two spaced-apart side wall portions connected by a bottom portion and at least one aforementioned adjusting mechanism disposed on each side wall portion.

In another aspect of the invention the cradle further includes at least one locking element adapted to engage a portion of a channel segment and maintain the channel segment in position in the cradle. In one embodiment, the cradle comprises two spaced-apart side wall portions connected by a bottom portion and the locking element comprises a push-pin disposed through a side wall portion and adapted to bear on a portion of the channel segment when actuated.

In many embodiments, the cradle is adapted to hold an end portion of two channel segments in a substantially aligned end-to-end relationship. In one aspect of the invention, the cradle comprises two substantially parallel spaced-apart side wall portions connected by a bottom portion and is configured to hold an end portion of two channel segments, and at least one side wall portion includes an orthogonal bearing surface adapted to cooperate with a corresponding bearing surface on at least one channel segment so as to dispose the channel segments in a substantially aligned end-to-end relationship. In preferred embodiments, each side wall portion includes an orthogonal bearing surface adapted to cooperate with a corresponding bearing surface on at least one channel segment so as to maintain said channel segments in a substantially aligned end-to-end relationship.

It is another aspect of the invention to provide a method of installing a channel segment in a trench. The method comprises disposing at least one elongate support member in the trench substantially orthogonally of the bottom of said trench; disposing a cradle assembly as hereinbefore described on the support member and securing the adjusting mechanism or mechanisms to the support member or members; disposing a portion of a drainage channel segment in the cradle; and, adjusting the position of the cradle relative to the support member; whereby the relative position of the channel segment is adjusted.

In one embodiment, the method further includes disposing an end portion of a second drainage channel segment in the cradle either prior to or after the adjusting step. In one aspect of the method, the adjusting mechanism comprises first and second adjusting components, each including a passage adapted to receive the support member and a screw adapted to bear on the support member when disposed in the passage, one of the adjusting components further including an adjusting screw adapted to cooperate with the other of the adjusting components so as to adjust the relative distance between the two; and the step disposing the cradle assembly on the support member comprises disposing the support member through the passages and securing one of the adjusting components to the support member by turning the bearing screw, and wherein the step adjusting comprises turning the adjusting screw to adjust the relative distance between the two adjusting components. In preferred embodiments, the method further comprises securing the other of the adjusting components to the support member upon completion of the adjusting step. In another aspect, wherein said cradle further includes at least one locking element adapted to engage a portion of a channel segment, the method further comprises actuating the locking element or elements to maintain the channel segment in the cradle.

In yet another aspect, wherein the cradle comprises two spaced apart side wall portions connected by a bottom portion, and further includes at least one adjusting mechanism disposed on each side wall, each said adjusting mechanism comprising a first adjusting component secured to the cradle, a second adjusting component adapted to be secured to a support member, and means for adjusting the distance between the components, the method further comprises disposing a pair of support members in the trench; disposing said cradle assembly on the support members and securing each of the second adjusting components to a respective support member, whereafter the cradle can be adjusted relative to the support member by a single person simply turning the adjusting screw.

DESCRIPTION OF THE INVENTION

The present invention provides a drainage channel installation device and method which enables the efficient and accurate installation of drainage channels within a trench. A significant advantage of the installation device of the invention is that final channel alignment can be performed quickly, easily and precisely by a single worker. Thus, in accordance with the present invention there is provided an installation device in the form of a cradle assembly for supporting at least a portion of a drainage channel section or unit in an adjustable manner on a support member such as, for example, a steel reinforcing bar or rebar. The cradle is configured to receive a portion of at least one channel segment. Although the cradle can be configured to support the channel segment anywhere along its length, in preferred embodiments it is advantageous for the cradle to be configured to receive the respective male and female ends of two adjacent channel sections. Employing a cradle assembly at each channel joint ensures a good seam between segments to minimize leaks and provide a smooth transition between the upper edges of the segments to provide a smooth and level seat for a drainage grate.

To obtain the advantageous adjustability of the invention the cradle assembly includes at least one adjusting mechanism which is structured to secure the cradle assembly to the support member, yet at the same time allow for the simultaneous adjustment of the cradle, and hence any channel segment disposed therein, with respect to the support member. In this way, once the channel segments and cradle assemblies are disposed and fixed in place on the support members, it is no longer necessary for workers to physically suspend the channel segments by hand. Thus, final vertical adjustments of the cradle and channel can be attended to by a single worker actuating the adjustment mechanism to change the position of the cradle relative to the support member.

Of course, in preferred embodiments the cradles will be generally U-shaped on end, having two substantially parallel side wall portions that are connected by a bottom portion and spaced apart so as to receive portions, preferably end portions, of the generally U-shaped channel segments, and will include at least one such adjusting mechanism on each side wall. Thus, in preferred installations where pairs of support rods are used, each side of the cradle assembly can be affixed to a respective one of the pair of support rods.

In one aspect of the invention, the adjusting mechanism includes a first adjusting component which is secured to the cradle and a second adjusting component which can be secured to the support member and which is capable of relative movement with respect to the first adjusting component. The mechanism further includes means for adjusting the relative distance or spacing between the two adjusting components. In preferred aspects of the invention, the first adjusting component will comprise a member or appendage extending generally orthogonally from the side wall of the cradle and will include a passage through which the support rod can pass. In preferred embodiments, a screw will be disposed adjacent the passage in the first adjusting component such that, upon tightening, it will extend into the passage. In this way, once the final adjustment of the cradle has been obtained, the screw can be tightened so as to bear on the support rod in the passage and fix the cradle in position with respect thereto. Similarly, in the preferred embodiments, the second adjusting component will also comprise a member or block of material which includes a passage through which the support rod can pass, and a screw capable of extending into the passage and bearing on the support rod upon tightening. In this way, the entire cradle assembly can be secured to the support rod with the second adjusting component while still allowing for relative movement of the first adjusting component and the remainder of the cradle assembly with respect thereto. Once both screws are tightened to bear on the support rod, the entire cradle assembly, including the cradle portion, will be fixed in position on the support rod.

Any means for adjusting the spacing of the two adjusting components will be suitable for use in the invention in view of the instant disclosure. In the preferred embodiments, one or the other of the adjusting components will include a screw capable of cooperating with the other of the adjusting components so as to adjust the relative distance between the two when the screw is actuated. In one embodiment, one of the components, preferably the first component, can include a hole that is co-registered with a threaded hole in the second component, such that a screw extending from one hole into the other will, when turned, adjust the relative distance between the two. Alternatively, one or the other of the components will simply include a surface onto which a screw disposed through a threaded hole on the other of said components can bear to adjust the distance between the two when actuated. Other possible adjusting means can include a toothed element extending between the adjusting components which cooperates with a knob, wheel or crank, such as a toothed hex nut, disposed in one of the components to adjust the relative distance between the two when rotated. These and other adjusting means will be apparent to those of ordinary skill in the art in view of the instant disclosure.

To maintain the relative lateral position of the adjusting components and corresponding co-registration of the passages therein relative to one another, as well as to facilitate the cooperation of the two components, one or both of the first and second adjusting components preferably include structure extending between them which limits their relative lateral movement. In preferred embodiments, one or both of the adjusting components will include one or more guide tabs or fingers extending toward the other adjusting component and positioned to cooperate therewith to limit the relative lateral movement between the two. In one embodiment, one or both of the components can include a guide tab or finger which extends into and cooperates with a female aperture in the other component to limit such movement. In preferred embodiments, one of the components will include a pair of guide tabs extending toward the other component and spaced to straddle and receive at least a portion of the other adjusting component. In this way, the components can be moved toward and away from each other vertically between the guide tabs while their relative lateral movement is limited by the tabs so as to maintain the co-registration of the passages and facilitate longitudinal movement of the respective components along the support rod.

It will be apparent from the instant disclosure that the ease and precision with which the channel segments can be installed and aligned will depend to some degree on the configuration of the cradle itself. The cradle is preferably designed to provide for good vertical and horizontal end-to-end alignment and engagement of the respective channel segment ends so as to minimize leakage defects in the seams or joints between channel segments, as well as to provide a smooth transition at the upper edges of the channel walls. Accordingly, it is desirable to provide a structure which facilitates precise co-registration between channel segment ends and which can lock the channel segments in place in the cradle to prevent movement once such co-registration is obtained and the segments joined. To this end, although suitable for use with butt jointed channels, the preferred cradles of the invention are adapted to hold the respective male and female ends of two channel segments in a substantially aligned end-to-end relationship. Preferably, the cradle is generally U-shaped with two substantially parallel side wall portions connected by a bottom portion and spaced so as to receive the ends of the channel segments therein. Of course, the side wall portions and bottom need not be continuous and to save material costs and reduce the weight of the device, various frame like structures can be employed as seen in the drawings below.

Advantageously, the outer surfaces of many drainage channels, such as the ACOdrain™ line of drainage channels manufactured by ACO Polymer Products, Inc., are not perfectly smooth, but instead include detents, protrusions, contours or other detail which present bearing surfaces that can be used to provide fixed registration points between adjacent channel segments. Thus, in the preferred embodiments, the cradle walls and/or bottom will include one or more surfaces which correspond to and cooperate with such contours, indentations, protrusions or other bearing surfaces on the channel ends so that adjacent channels segments will automatically nest within the cradle in a substantially aligned end-to end relationship. In one aspect of these embodiments, the aforementioned cradle side walls, which run substantially parallel to an adjacent outer channel side wall disposed in the cradle, will include orthogonal surface portions adapted to cooperate with corresponding orthogonal surfaces in or protruding from the outer channel side wall such that when bearing surfaces of adjacent end-to-end channel segments are resting on the appropriate orthogonal surfaces of the cradle, the respective channel segments will be substantially aligned.

Once the channel segments are aligned in the cradle, it is advantageous to lock the segments in place so as to limit movement during the remainder of the installation and during the pouring of the concrete. Accordingly, in the preferred embodiments the cradle assembly will include at least one locking element adapted to engage a portion of a channel section disposed in the cradle and thereby maintain the channel in position in the cradle. As will be apparent from the instant disclosure, any locking mechanism capable of fixing the channel segment into the cradle will be suitable for use in the invention and can include by way of example only, clips, nails, pins, hooks, straps and so on. In the preferred embodiments, the cradle walls include one, and preferably at least two, push-pins which, when a channel segment is properly seated in the cradle, can be pushed to engage the side walls of the channel segment. Still more preferably, the push-pins will correspond to a recess, detent or other detail of the channel end to securely lock the channel in place in the cradle.

As will be apparent to those of ordinary skill in the art reading the instant disclosure, the foregoing cradle assembly device according to the invention enables an improved method of installing trench drain or ducting channels. Once the support rods are properly positioned within the trench, the cradle assemblies of the invention can be secured thereto either before or after the channel sections are nested in the cradle. Because the adjusting mechanisms still allow relative movement of the cradle with respect to the support rods even though the assembly as a whole is securely fixed thereto, once the channel sections are mounted in the cradle a single worker can simply and precisely perform the final adjustments to the channel alignment by actuating the adjusting mechanisms.

A greater understanding of these and other aspects of the invention will be had from the following detailed description and accompanying drawings.

DETAILED DESCRIPTION OF THE PREFERRED EMBODIMENTS

Figure 1:
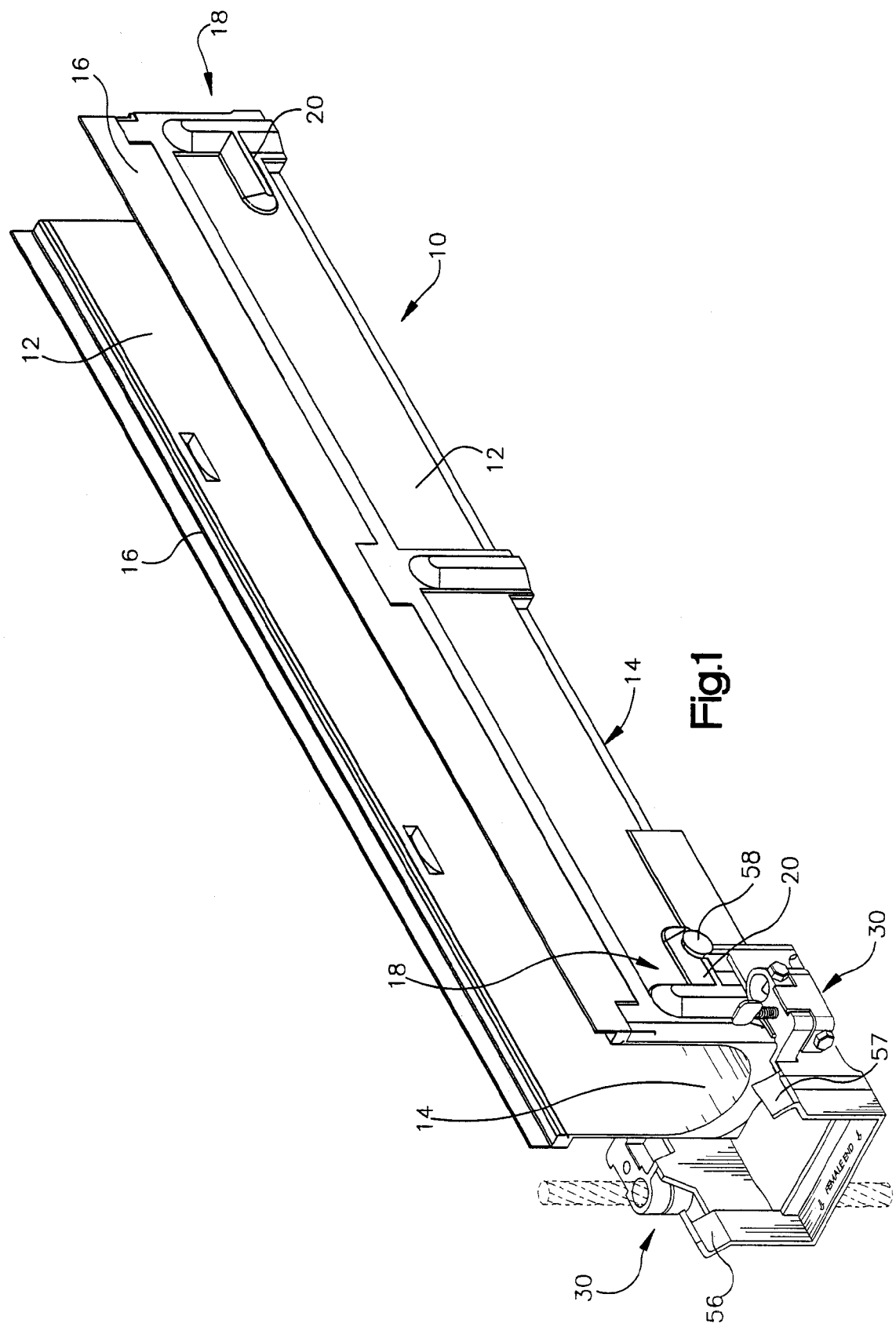
FIG. 1 is a perspective elevation of a cradle assembly according to the invention having an end of a drainage channel segment seated therein.

As seen in FIG. 1, a drainage channel section, shown generally at 10, with which the cradle assembly according to the invention may be used is a generally U-shaped conduit having side walls 12, a bottom 14 and upper edge portions 16. As shown, upper edge portions 16 include a generally L-shaped metal seating strip for receiving a drainage grate (not shown).

As seen generally at 18 in FIG. 1, the channel segment shown includes various contours and detailing at its ends. In the segment shown, the protrusions 20, called frost keys, are consistently located on every channel segment so as to provide a consistent, fixed registration point for aligning each adjacent channel segment even though the pitch and or depth of each respective channel segment may vary. Thus, as described in connection with FIG. 2, by including orthogonal surfaces 56 which are angled to correspond to the lower bearing surface of the frost keys 20, the cradle assembly according to the invention provides a fixed seating surface onto which the ends of adjacent channel segments can nest in a substantially aligned end-to-end relationship. It will be apparent to those of ordinary skill in the art that other drainage channels will have different end contours than as specifically shown that will be suitable for providing a fixed registration point, and it is within the level of ordinary skill in the art in view of the instant disclosure to configure the cradle to include suitable bearing surfaces to cooperate with any such contours.

Figure 2:
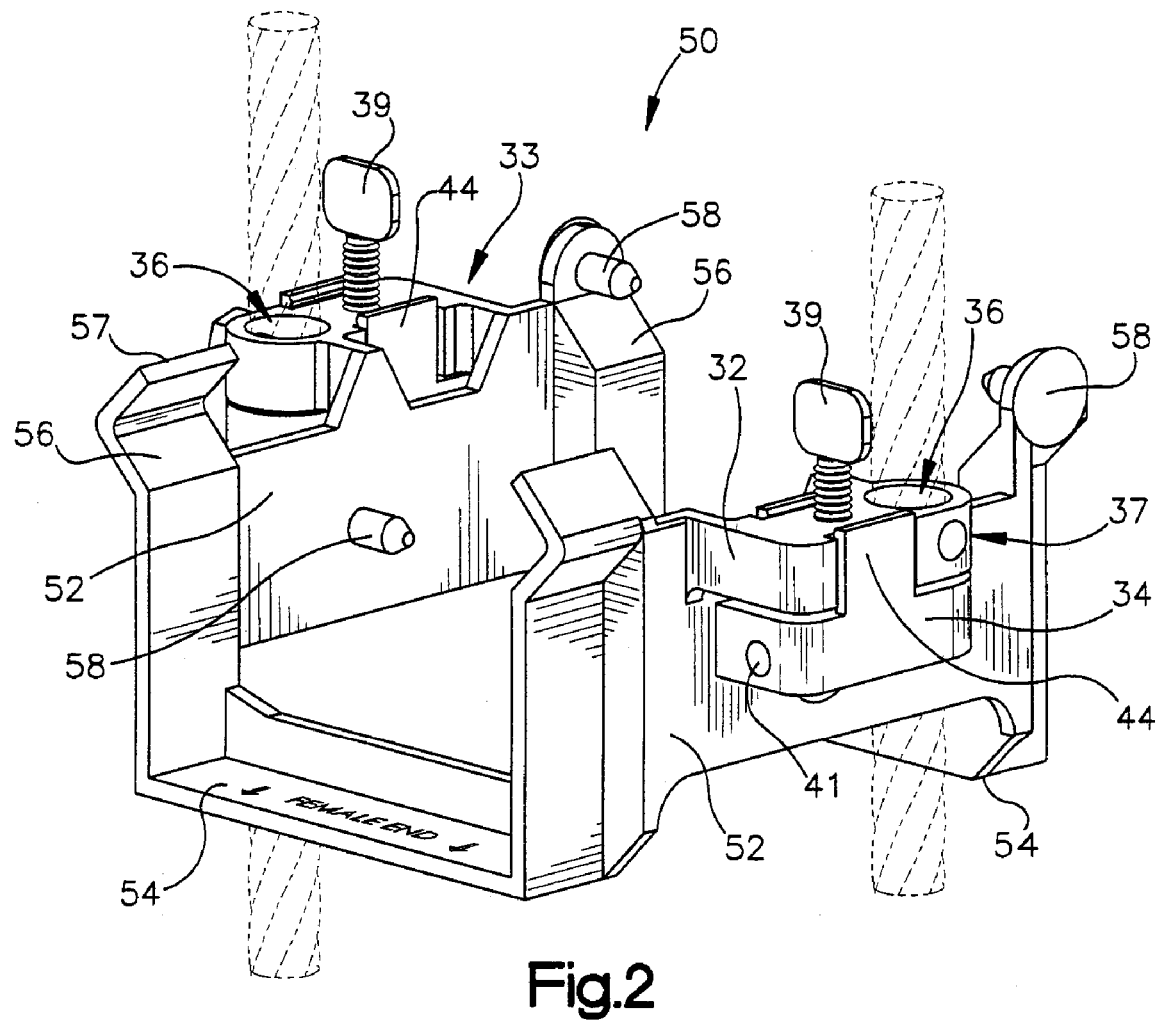
FIG. 2 is a perspective view of a cradle assembly according to the invention.
Figure 3:
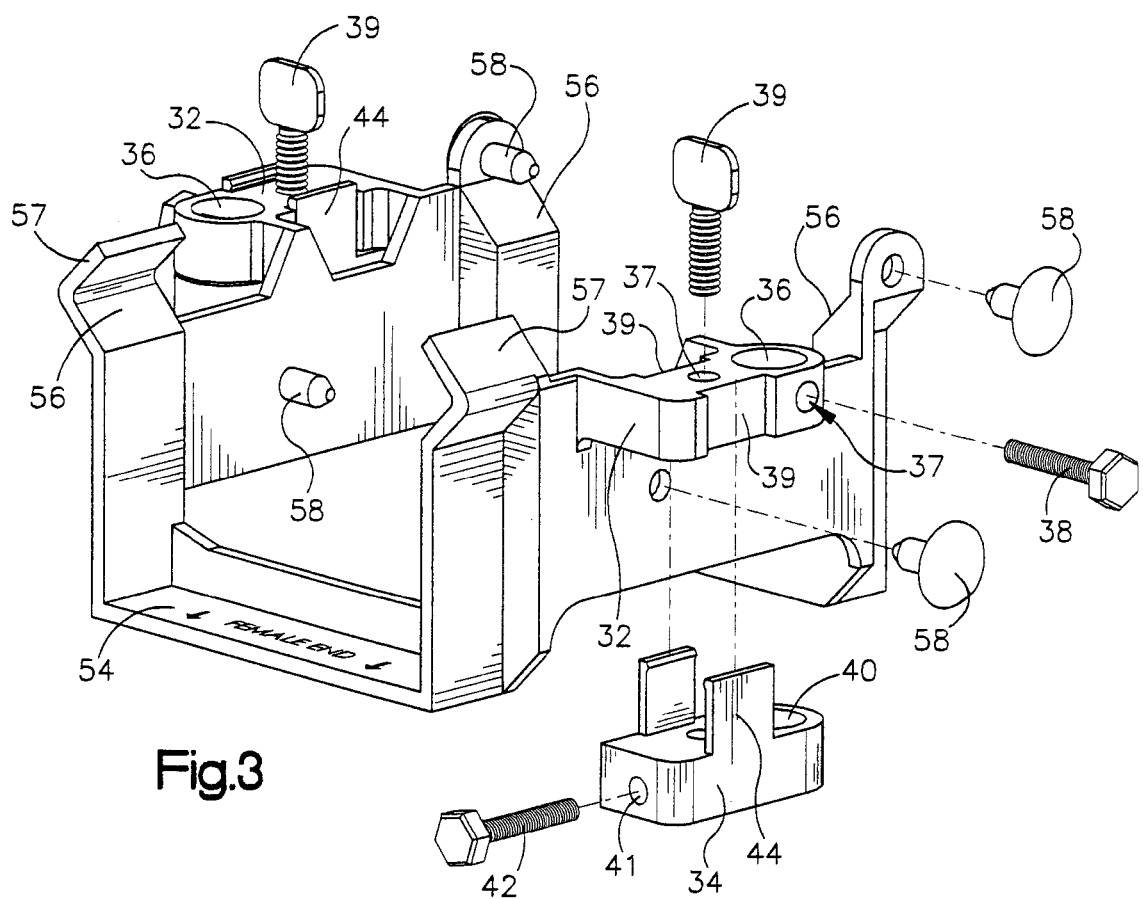
FIG. 3 is an exploded view of a cradle assembly according to the invention.

The cradle assembly according to the preferred embodiments is best seen in FIGS. 2 and 3. As shown generally at 50, the cradle assembly includes generally parallel side wall portions 52 which are connected by bottom portions 54 and spaced apart so as to receive the ends of adjacent channel segments 10. As noted above, the side wall portions 52 of the cradle include seating surfaces 56 disposed orthogonally with respect to the side walls and positioned to correspond to the bearing surfaces of the frost keys 20 of the channel segments 10. Preferably, one end of the cradle 50, the female receiving end of the embodiment shown, includes retaining tabs 57 positioned to form a recess between itself and the seating surface 56 into which a frost key or other aligning structure can be securely seated. As discussed below, this can facilitate installation by forming a secure relationship with one end of the channel segment and the next adjacent segment and can simply be laid into the cradle and seated on surfaces 56. Once the channel segment 10 is seated within the cradle 50 on bearing surfaces 56 the segment can be secured in place by actuation of locking pins 58. When pushed into engagement with the channel segment 10 the pins will lock the channel into place in the cradle. This facilitates the ability to carry the channel segment to the trench for installation without falling out of the cradle. Push pins 58 can be formed of metal or plastic and can include detents or ridges to provide a snap-fit when the push pins 58 engage corresponding through holes in the side wall portions 52. Similarly, they can be spring or otherwise biased to bear on the outer channel side walls.

As shown, each side wall 52 of the cradle assembly 50 includes an adjusting mechanism, shown generally at 30 in FIG. 1. As best seen in FIGS. 2 and 3, the adjusting mechanism includes a first adjusting component 32, which is essentially an elongate flange or appendage extending orthogonally from and secured to the side wall 52 of the cradle 50, and a second adjusting component 34 which, as shown, is an elongate block corresponding substantially in dimension to the first component 32 and oriented below the first component with respect to the open end of the cradle. The component 32 is preferably fixed to the side wall 52 in a spaced relationship so as to include passage 33 between the side wall and the body of the first adjusting component. Passage 33 facilitates the cooperation of the respective adjusting components as discussed in more detail below. The first adjusting component further includes a vertically oriented passage 36 dimensioned to receive a support rod such as rebar. In the wall of the passage there is disposed a threaded hole 37 for receiving a screw 38 such that the first adjusting component can be fixed to a support rod disposed in the passage 36 by tightening screw 38 to bear on the support rod.

Figure 4:
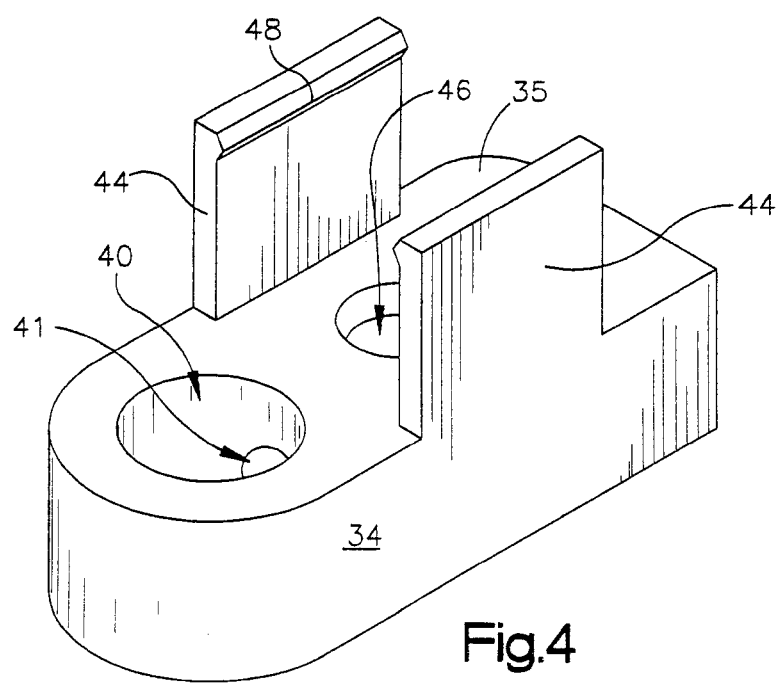
FIG. 4 is a perspective view of a portion of an adjusting mechanism for use in a cradle assembly according to the invention.

As noted, the second adjusting component 34, seen best in FIGS. 3 and 4, is essentially a block having an upper surface 35 which is oriented so as to face the bottom surface of the first adjusting component 32, and likewise includes a passage 40 dimensioned to receive a support rod therethrough. In order to secure the second component 34 to a support rod, the wall of passage 40 likewise includes a threaded hole 41 for receiving screw 42. Component 34 can then be fixed to the support rod by tightening screw 42 to bear on the rod. To minimize relative lateral movement between adjusting components 32 and 34 and to facilitate the cooperation of the two components, component 34 includes a pair of guide tabs 44 extending from the upper surface 35 toward the first component 32 and spaced to straddle the first component 32 with one of the tabs extending into the passage 33. This configuration minimizes lateral movement between the components and maintains co-registration of the passages 36, 40. In the preferred embodiment shown, the sides of component 32 straddled by tabs 44 include recesses 39 into which the tabs slidably fit. Because the tabs 44 are dimensioned to slidably fit within the recesses 39, lateral movement between the two components in all directions is reduced, and the cooperation of the two adjusting components is improved. Moreover, by including ridge portions 48 at the distal ends of guide tabs 44 include ridge portions 48 at their distal end, the second adjusting component is readily retained on the cradle assembly during handling when the ridges 48 snap over the upper surface of component 32. Retention of adjusting component 34 on the assembly is also facilitated by a friction fit between tabs 44 and the recesses 39 of the first adjusting component 32.

In order to adjust the distance between the first and second adjusting components 32, 34, the first adjusting component further includes a vertically disposed threaded hole 37 and corresponding screw 39 extending therethrough. The upper surface 35 of component 34 includes a bearing detent 46 within which the end of screw 39 can seat. With the component 34 fixed to the reinforcing bar, and locking screw 38 disengaged from the rebar, the cradle can be adjusted up and down with respect to the rebar by turning screw 39 thereby forcing the cradle toward or away from the adjusting component 34 which, as noted, is fixed to the rebar.

In the preferred embodiment, the cradle 50, first adjusting component 32 and associated screws are made of metal, while the push-pins 58 and second adjusting component 34 are made of plastic. It will be apparent to those of ordinary skill in the art in view of the instant disclosure that the various components can be made out of other materials.

In carrying out the invention, a trench is typically excavated and a series of pairs of steel support rods or rebar, shown in phantom on the drawings, are driven substantially vertically into the bottom of the trench at appropriate distances. Thereafter, one can begin to install segments of drainage channel 10 into the trench between the pairs of support rods. Typically, the channel is installed from the deepest to the shallowest. Normally, installation is begun by installing an end segment of drainage channel such that the female end of the channel is disposed in cradle 50 having its frost keys slid into and retained by the recesses formed between orthogonal bearing surfaces 56 and retaining tabs 57. The female end of the channel segment can either be disposed in cradle 50 prior to installation of the cradle assembly onto the rebar or after. To install the cradle assembly to the support rods one can simply place the ends of the support rods into the passages 36 and 40 and lower the assembly onto the support rods. Once the assembly is positioned on the support rods at its approximate desired location, the assembly is then fixed to the support rods by tightening screws 42 to bear against the support rod. Once the cradle assembly is secured to a pair of support rods by screws 42, the male end of the next channel segment can simply be laid into the cradle so that the bottom surfaces of the male-end frost keys seat on bearing surfaces 56. The next cradle assembly 50 can then be installed on the female end of the channel segment just mounted and secured to the next pair of support rods by screws 42. The process can then be repeated until a desired length of drainage channel suspended within the trench. Because the bearing surfaces 56 provide a fixed registration point when frost keys 20 are properly seated, the thus installed channel will already be substantially aligned in an end-to-end relationship. Final adjustment of the cradle, and hence the channel height, is accomplished by tightening or loosening screw 39 to adjust the distance between the first adjusting element 32 and the second adjusting element 34. Once the final desired cradle position is obtained, then the entire assembly can be finally secured to the support rods by tightening screws 38 to bear against the support rods. Thereafter, final installment of the drainage channel is obtained by pouring concrete or the like into the trench around the channel. Because the channel is secured within the cradles, which are in turn fixed to the support rods, the channel will not float or shift in the trench during the concrete installation.

Modifications and variations of the invention will be apparent to those skilled in the art in the light of the foregoing detailed disclosure and drawings. Therefore, it is to be understood that, with the scope of the appended claims, the invention can be practiced otherwise than shown and described.

What is claimed is:

1. A cradle assembly for supporting at least a portion of a channel segment in an adjustable manner on a support member comprising:
   a. a cradle adapted to receive a portion of at least one said channel segment;
   b. at least one adjusting mechanism disposed on said cradle, said adjusting mechanism including a first adjusting component secured to said cradle and a second adjusting component including means for adjusting a vertical position of said cradle relative to said support member, said adjusting mechanism further including means for adjusting a position of said first adjusting component relative to said second adjusting component to further adjust the vertical position of said cradle relative to said support member,
   wherein said means for adjusting a vertical position of said cradle relative to said support member comprises a screw.

2. The assembly according to claim 1, wherein said means for adjusting a position of said first adjusting component relative to said second adjusting component comprises a screw.

3. A cradle assembly for supporting at least a portion of a channel segment in an adjustable manner on a support member comprising:
   a. a cradle adapted to receive a portion of at least one said channel segment;
   b. at least one adjusting mechanism disposed on said cradle, said adjusting mechanism including a first adjusting component secured to said cradle and a second adjusting component including means for adjusting a vertical position of said cradle relative to said support member, said adjusting mechanism further including means for adjusting a position of said first adjusting component relative to said second adjusting component to further adjust the vertical position of said cradle relative to said support member,
   further including means for fixing a vertical position of said first adjusting component relative to said support member,
   wherein said means for fixing a vertical position of said first adjusting component relative to said support member comprises a screw.

4. The assembly according to claim 1, wherein said first adjusting component is fixed to a sidewall of said cradle.

5. A cradle assembly for supporting at least a portion of a channel segment in an adjustable manner on a support member comprising:
   a. a cradle adapted to receive a portion of at least one said channel segment;
   b. at least one adjusting mechanism disposed on said cradle, said adjusting mechanism including a first adjusting component secured to said cradle and a second adjusting component including means for adjusting a vertical position of said cradle relative to said support member, said adjusting mechanism further including means for adjusting a position of said first adjusting component relative to said second adjusting component to further adjust the vertical position of said cradle relative to said support member
   wherein each of said first and second adjusting components includes a passage adapted to receive said support member.

6. The assembly according to claim 5, wherein said passages are substantially co-registered.

7. The assembly according to claim 6, wherein said means for adjusting a position of said first adjusting component relative to said second adjusting component comprises a screw extending substantially parallel to said co-registered passages.

8. The assembly according to claim 1, further comprising means for minimizing lateral movement between said first and second adjusting components.

9. The assembly according to claim 8, wherein said means for minimizing lateral movement includes a pair of guide tabs.

10. A cradle assembly for supporting at least a portion of a channel segment in an adjustable manner on a support member comprising:
    a. a cradle adapted to receive a portion of at least one said channel segment;
    b. at least one adjusting mechanism disposed on said cradle, said adjusting mechanism including a first adjusting component secured to said cradle and a second adjusting component including means for adjusting a vertical position of said cradle relative to said support member, wherein said adjusting mechanism is adapted to adjust a position of said first adjusting component relative to said second adjusting component to further adjust the vertical position of said cradle relative to said support member, wherein each of said first and second adjusting components includes means for independently fixing said respective adjusting components to said support member.

11. The assembly according to claim 10, wherein each of said means for independently fixing includes a screw.

12. The assembly according to claim 10, further comprising a screw adapted to adjust the position of said first adjusting component relative to said second adjusting component to further adjust the vertical position of said cradle relative to said support member.

13. The assembly according to claim 12, wherein each said first and second adjusting components includes a passage adapted to receive said support member, wherein said passages are substantially co-registered and parallel with the screw.

14. A cradle assembly for supporting at least a portion of a channel segment in an adjustable manner on a support member comprising:
   a. a cradle adapted to receive a portion of at least one said channel segment;
   b. at least one adjusting mechanism disposed on said cradle, said adjusting mechanism including a first adjusting component secured to said cradle and a second adjusting component configured to be secured to said support member with said cradle at a vertical position with respect to said support member, wherein each of said first adjusting component and said second adjusting component includes a passage adapted to receive said support member, said adjusting mechanism further including means for adjusting a position of said first adjusting component relative to said second adjusting component to further adjust the vertical position of said cradle relative to said support member.

15. The assembly according to claim 14, wherein each said first and second adjusting components includes means for independently fixing said respective adjusting components to said support member.

16. The assembly according to claim 14, wherein said passages are substantially co-registered.

17. The assembly according to claim 16, further comprising means for maintaining co-registration of said passages.

18. The assembly according to claim 14, further comprising means for minimizing lateral movement between said first and second adjusting components.

\* \* \* \* \*